United States Patent
Ito et al.

(10) Patent No.: US 8,497,334 B2
(45) Date of Patent: Jul. 30, 2013

(54) CONJUGATED DIENE POLYMER, CONJUGATED DIENE POLYMER COMPOSITION, AND METHOD FOR PRODUCING CONJUGATED DIENE POLYMER

(75) Inventors: Mana Ito, Shinjuku-ku (JP); Katsunari Inagaki, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 212 days.

(21) Appl. No.: 13/053,804

(22) Filed: Mar. 22, 2011

(65) Prior Publication Data
US 2011/0245407 A1   Oct. 6, 2011

(30) Foreign Application Priority Data

Mar. 30, 2010 (JP) ................... 2010-077181
May 6, 2010 (JP) ................... 2010-106183

(51) Int. Cl.
*C08F 30/08* (2006.01)
(52) U.S. Cl.
USPC ............ 526/279; 526/123.1; 526/124.1; 526/204; 526/335; 526/338; 526/340
(58) Field of Classification Search
None
See application file for complete search history.

(56) References Cited

FOREIGN PATENT DOCUMENTS

| DE | 102006059295 A1 | * | 6/2008 |
|---|---|---|---|
| EP | 1734060 A1 | | 12/2006 |
| EP | 1854839 A1 | | 11/2007 |
| EP | 1925636 A1 | | 5/2008 |
| EP | 2060604 A1 | | 5/2009 |
| JP | 1-29802 B2 | | 6/1989 |

OTHER PUBLICATIONS

Abstract for DE 102006059295 (Jun. 2008).*
Singaporean Search Report issued in corresponding Singapore Application No. 201101988-2, dated Sep. 26, 2011.

* cited by examiner

*Primary Examiner* — Marc Zimmer
(74) *Attorney, Agent, or Firm* — Sughrue Mion, PLLC

(57) ABSTRACT

A conjugated diene polymer comprising a constitutional unit based on a conjugated diene and a constitutional unit based on a compound represented by Formula (1) below, $$R^1Si(OR^2)_m R^3_n R^4_{(3-m-n)} \quad (1)$$

wherein m represents 1 or 2; n represents 1 or 2; m+n=2 or 3; $R^1$ represents a hydrocarbyl group having a polymerizable carbon-carbon double bond; $R^2$ represents a hydrocarbyl group, and, when there are plural $R^2$s, $R^2$s each may be the same or different; $R^3$ represents an aryl group that may have an oxygen-containing substituent, and, when there are plural $R^3$s, $R^3$s each may be the same or different; and $R^4$ represents an alkyl group or a substituted amino group.

3 Claims, No Drawings

CONJUGATED DIENE POLYMER, CONJUGATED DIENE POLYMER COMPOSITION, AND METHOD FOR PRODUCING CONJUGATED DIENE POLYMER

TECHNICAL FIELD

The present invention relates to a conjugated diene polymer, a conjugated diene polymer composition, and a method for producing a conjugated diene polymer.

BACKGROUND ART

In recent years, with the growing concern over environmental problems, the demand for good fuel economy for automobiles has been becoming stronger, and there is also a demand for excellent fuel economy for rubber compositions used for automobile tires. As polymer compositions for automobile tires, a rubber composition containing a conjugated diene polymer such as polybutadiene or butadiene-styrene copolymer and a reinforcing agent is used.

For example, JP-B-1-29802 (JP-B denotes a Japanese examined patent application publication) proposes a styrene-butadiene copolymer of a high vinyl bond, and a polymer composition using the copolymer.

DISCLOSURE OF THE INVENTION

However, polymer compositions using above-described conventional conjugated diene polymer are not sufficiently satisfactory in the strength.

Under such circumstances, objects of the present invention are to provide a conjugated diene polymer capable of giving a polymer composition excellent in strength, a polymer composition containing the conjugated diene polymer and a reinforcing agent, and a method for producing the conjugated diene polymer.

A first of the present invention relates to a conjugated diene polymer having a monomer unit based on a conjugated diene and a monomer unit based on a monomer represented by Formula (1) below,

(wherein, m represents 1 or 2; n represents 1 or 2; m+n=2 or 3; $R^1$ represents a hydrocarbyl group having a polymerizable carbon-carbon double bond; $R^2$ represents a hydrocarbyl group, and, when there are plural $R^2$s, $R^2$s each may be the same or different; $R^3$ represents an aryl group that may have an oxygen-containing substituent, and, when there are plural $R^3$s, $R^3$s each may be the same or different; and $R^4$ represents an alkyl group or a substituted amino group.

A second of the present invention relates to a conjugated diene polymer composition containing the conjugated diene polymer and a reinforcing agent.

A third of the present invention relates to a method for producing a conjugated diene polymer by polymerizing a monomer component containing a conjugated diene and a compound represented by Formula (1) below by an alkali metal catalyst in a hydrocarbon solvent,

wherein m represents 1 or 2; n represents 1 or 2; m+n=2 or 3; $R^1$ represents a hydrocarbyl group having a polymerizable carbon-carbon double bond; $R^2$ represents a hydrocarbyl group, and, when there are plural $R^2$s, $R^2$s each may be the same or different; $R^3$ represents an aryl group that may have an oxygen-containing substituent, and, when there are plural $R^3$s, $R^3$s each may be the same or different; and $R^4$ represents an alkyl group or a substituted amino group.

MODE FOR CARRYING OUT THE INVENTION

The conjugated diene polymer of the present invention is a conjugated diene polymer having a monomer unit based on a conjugated diene and a monomer unit based on a monomer represented by Formula (1) below,

wherein m represents 1 or 2; n represents 1 or 2; m+n=2 or 3; $R^1$ represents a hydrocarbyl group having a polymerizable carbon-carbon double bond; $R^2$ represents a hydrocarbyl group, and, when there are plural $R^2$s, $R^2$s each may be the same or different; $R^3$ represents an aryl group that may have an oxygen-containing substituent, and, when there are plural $R^3$s, $R^3$s each may be the same or different; and $R^4$ represents an alkyl group or a substituted amino group.

In the present specification, the hydrocarbyl group represents a hydrocarbon residue. A hydrocarbyloxy group represents a group in which a hydrogen atom in a hydroxyl group is substituted by a hydrocarbyl group. A hydrocarbylene group represents a divalent hydrocarbon residue.

The conjugated diene includes 1,3-butadiene, isoprene, 1,3-pentadiene, 2,3-dimethyl-1,3-butadiene, 1,3-hexadiene, etc., and these are used in not less than one. Examples of the conjugated diene include preferably 1,3-butadiene and isoprene.

$R^1$ is a hydrocarbyl group having a polymerizable carbon-carbon double bond. Examples of $R^1$ include preferably groups represented by Formula (2) below,

wherein p is 0 or 1, $R^5$ represents a hydrogen atom or a hydrocarbyl group, and T represents a hydrocarbylene group, and * denotes a bonding position.

In Formula (2), p represents 0 or 1.

The hydrocarbyl group of $R^5$ includes an alkyl group, an alkenyl group, etc. The alkyl group includes a methyl group, an ethyl group, a n-propyl group, an isopropyl group, a n-butyl group, a sec-butyl group, a tert-butyl group, etc., and a methyl group is preferable. The alkenyl group includes a vinyl group, an allyl group, a 1-propenyl group, a 1-methylethenyl group, etc., and a vinyl group is preferable.

As $R^5$, a hydrogen atom, a methyl group or a vinyl group is preferable, and a hydrogen atom is more preferable.

The hydrocarbylene group of T includes an alkylene group, an arylene group, groups formed by uniting an arylene group and an alkylene group, etc.

The alkylene group includes a methylene group, an ethylene group, a trimethylene group, etc. The alkylene group is preferably a methylene group or an ethylene group. The arylene group includes a phenylene group, a naphthylene group, a biphenylene group, etc. The arylene group is preferably a phenylene group.

Groups formed by uniting an arylene group and an alkylene group include a group formed by uniting a phenylene group and an alkylene group, a group formed by uniting a naphthylene group and an alkylene group, and a group formed by uniting a biphenylene group and an alkylene group. Groups formed by uniting a phenylene group and an alkylene group (phenylene-alkylene groups) include para-phenylene-alkylene groups (for example, groups represented by Formula (2a) below), meta-phenylene-alkylene groups (for example, groups represented by Formula (2b) below), and ortho-phenylene-alkylene groups (for example, groups represented by Formula (2C) below), depending on the position of a carbon atom on a benzene ring from which a hydrogen atom is removed and the position of a carbon atom on a benzene ring to which an alkylene group is bonded.

In the group formed by uniting an arylene group and an alkylene group, preferably, a carbon atom of the arylene group of the group is bonded to a carbon atom to which $R^5$ of Formula (2) is bonded.

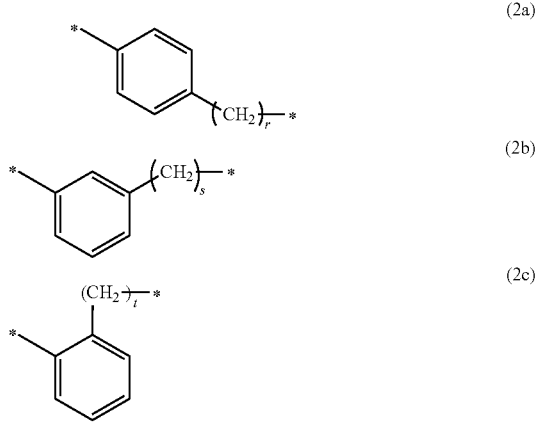

wherein r, s and t each represents an integer of 1 to 10, and * denotes a bonding position.

As the group formed by uniting an arylene group and an alkylene group (phenylene-alkylene group), groups formed by uniting a phenylene group and an alkylene group are preferable, groups represented by Formula (2a) and groups represented by Formula (2b) are more preferable, and a para-phenylene-methylene group (group represented by Formula (2a) wherein r=1), a meta-phenylene-methylene group (group represented by Formula (2b) wherein s=1), a para-phenylene-ethylene group (group represented by Formula (2a) wherein r=2), and a meta-phenylene-ethylene group (group represented by Formula (2b) wherein s=2) are yet more preferable.

When $R^5$ is a methyl group, p is preferably 1, T is preferably a group formed by uniting an arylene group and an alkylene group, or an arylene group; more preferably a group formed by uniting a phenylene group and an alkylene group (phenylene-alkylene group), or a phenylene group; and yet more preferably a phenylene group, a para-phenylene-methylene group, a meta-phenylene-methylene group, a para-phenylene-ethylene group, or a meta-phenylene-ethylene group.

When $R^5$ is a vinyl group and p is 1, T is preferably an alkylene group, and more preferably a methylene group or an ethylene group.

Groups represented by Formula (2) include, preferably, as groups in which $R^5$ is a hydrogen atom, a vinyl group, a vinylmethyl group, a vinylethyl group, a 4-vinylphenyl group, a 3-vinylphenyl group, a (4-vinylphenyl)methyl group, a 2-(4-vinylphenyl)ethyl group, a (3-vinylphenyl)methyl group and a 2-(3-vinylphenyl)ethyl group; as a groups in which $R^5$ is a methyl group, a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group and a 2-(3-isopropenylphenyl)ethyl group; and, as groups in which $R^5$ is a vinyl group, a 1-methylene-2-propenyl group and a 2-methylene-3-butenyl group.

$R^1$ is preferably a vinyl group, a 4-vinylphenyl group or a 3-vinylphenyl group, and more preferably a vinyl group.

The hydrocarbyl group of $R^2$ includes an alkyl group, an aryl group etc.

The alkyl group of $R^2$ includes a methyl group; primary alkyl groups (alkyl groups in which the carbon atom from which a hydrogen atom is removed is a primary carbon atom) such as an ethyl group, a n-propyl group and a n-pentyl group; secondary alkyl groups (alkyl groups in which the carbon atom from which hydrogen atoms are removed is a secondary carbon atom) such as an isopropyl group, a sec-butyl group and a 2-ethylhexyl group; and tertiary alkyl groups (alkyl groups in which the carbon atom from which hydrogen atoms are removed is a tertiary carbon atom) such as a tert-butyl group and a tert-pentyl group.

The aryl group of $R^2$ includes a phenyl group, a tolyl group, a xylyl group, etc.

The number of carbon atoms of the hydrocarbyl group of $R^2$ is preferably 3 to 10, and more preferably 4 to 8.

The hydrocarbyl group of $R^2$ is preferably a secondary alkyl group or a tertiary alkyl group, more preferably a tertiary alkyl group, and yet more preferably a tert-butyl group.

$R^3$ is an aryl group that may have an oxygen-containing substituent. Here, the aryl group having an oxygen-containing substituent represents a group in which a hydrogen atom of the aryl group is substituted by an oxygen-containing substituent.

The aryl group of $R^3$ includes a phenyl group, a 1-naphthyl group, a 2-naphthyl group, a phenyl group substituted by an alkyl group, a 1-naphthyl group substituted by an alkyl group, and a 2-naphthyl group substituted by an alkyl group.

The alkyl group includes a methyl group; primary alkyl groups such as an ethyl group, a n-propyl group and a n-butyl group; secondary alkyl groups such as an isopropyl group, a sec-butyl group and a 2-ethylhexyl group; tertiary alkyl groups such as a tert-butyl group and a tert-pentyl group.

The phenyl group substituted by an alkyl group includes a methylphenyl group, an ethylphenyl group, a n-propylphenyl group, an isopropylphenyl group, a n-butylphenyl group, a sec-butylphenyl group, a tert-butylphenyl group, a tert-pentylphenyl group, a (2-ethylhexyl)phenyl group, etc.

The 1-naphthyl group substituted by an alkyl group includes a methyl-1-naphthyl group, an ethyl-1-naphthyl group, a n-propyl-1-naphthyl group, an isopropyl-1-naphthyl group, a n-butyl-1-naphthyl group, a sec-butyl-1-naphthyl group, a tert-butyl-1-naphthyl group, a tert-pentyl-1-naphthyl group, a (2-ethylhexyl)-1-naphthyl group, etc.

The 2-naphthyl group substituted by an alkyl group includes a methyl-2-naphthyl group, an ethyl-2-naphthyl group, a n-propyl-2-naphthyl group, an isopropyl-2-naphthyl group, a n-butyl-2-naphthyl group, a sec-butyl-2-naphthyl group, a tert-butyl-2-naphthyl group, a tert-pentyl-2-naphthyl group, a (2-ethylhexyl)-2-naphthyl group, etc.

The aryl group having an oxygen-containing substituent includes aryl groups having an alkoxy group such as a methoxy group, an ethoxy group, an isopropoxy group or a tert-butoxy group; an alkoxyalkyl group such as a methoxymethyl group, an ethoxymethyl group, a methoxyethyl group or an ethoxyethyl group; or an alkoxyalkoxy group such as a methoxymethoxy group, an ethoxymethoxy group, a methoxyethoxy group or an ethoxyethoxy group.

The phenyl group having an alkoxy group includes a methoxyphenyl group, an ethoxyphenyl group, an isopropoxyphenyl group, and a tert-butoxyphenyl group. The phenyl group having an alkoxyalkyl group includes a (methoxymethyl)phenyl group, an (ethoxymethyl)phenyl group, a (methoxyethyl)phenyl group, and an (ethoxyethyl)phenyl group. The phenyl group having an alkoxyalkoxy group includes a (methoxymethoxy)phenyl group, an (ethoxymethoxy)phenyl group, a (methoxyethoxy)phenyl group, and an (ethoxyethoxy)phenyl group.

The 1-naphthyl group having an alkoxy group includes a methoxy-1-naphthyl group, an ethoxy-1-naphthyl group, an isopropoxy-1-naphthyl group, and a tert-butoxy-1-naphthyl group. The 1-naphthyl group having an alkoxyalkyl group includes a (methoxymethyl)-1-naphthyl group, an (ethoxymethyl)-1-naphthyl group, a (methoxyethyl)-1-naphthyl group, and an (ethoxyethyl)-1-naphthyl group. The 1-naphthyl group having an alkoxyalkoxy group includes a (methoxymethoxy)-1-naphthyl group, an (ethoxymethoxy)-1-naphthyl group, a (methoxyethoxy)-1-naphthyl group, and an (ethoxyethoxy)-1-naphthyl group.

The 2-naphthyl group having an alkoxy group includes a methoxy-2-naphthyl group, an ethoxy-2-naphthyl group, an isopropoxy-2-naphthyl group, and a tert-butoxy-2-naphthyl group. The 2-naphthyl group having an alkoxyalkyl group includes a (methoxymethyl)-2-naphthyl group, an (ethoxymethyl)-2-naphthyl group, a (methoxyethyl)-2-naphthyl group, and an (ethoxyethyl)-2-naphthyl group. The 2-naphthyl group having an alkoxyalkoxy group includes a (methoxymethoxy)-2-naphthyl group, an (ethoxymethoxy)-2-naphthyl group, a (methoxyethoxy)-2-naphthyl group, and an (ethoxyethoxy)-2-naphthyl group.

The mono-substituted phenyl group includes a 2-substituted phenyl group, a 3-substituted phenyl group, and a 4-substituted phenyl group, according to substituted positions. The phenyl group substituted by an alkyl group or an oxygen-containing substituent may be a disubstituted body or a trisubstituted body, and includes a 2,3-disubstituted phenyl group, a 2,4-disubstituted phenyl group, a 2,5-disubstituted phenyl group, a 2,6-disubstituted phenyl group, a 3,4-disubstituted phenyl group, a 3,5-disubstituted phenyl group, a 2,3,4-trisubstituted phenyl group, a 2,3,5-trisubstituted phenyl group, a 2,4,5-trisubstituted phenyl group, a 2,4,6-trisubstituted phenyl group, a 3,4,5-trisubstituted phenyl group, etc., according to the substituted position and substituted number.

The mono-substituted 1-naphthyl group includes a 2-substituted 1-naphthyl group, a 3-substituted 1-naphthyl group, a 4-substituted 1-naphthyl group, a 5-substituted 1-naphthyl group, and a 6-substituted 1-naphthyl group, according to the substituted position. The 1-naphthyl group substituted by an alkyl group or an oxygen-containing substituent may be a disubstituted body or a trisubstituted body, and includes a 4,5-disubstituted 1-naphthyl group, a 4,8-disubstituted 1-naphthyl group, a 5,8-disubstituted 1-naphthyl group, a 6,7-disubstituted 1-naphthyl group, a 3,8-disubstituted 1-naphthyl group, a 6,8-disubstituted 1-naphthyl group, a 4,5,8-trisubstituted 1-naphthyl group, etc.

The mono-substituted 2-naphthyl group includes a 1-substituted 2-naphthyl group, a 3-substituted 2-naphthyl group, a 4-substituted 2-naphthyl group, a 5-substituted 2-naphthyl group, and a 6-substituted 2-naphthyl group, according to the substituted position. The 1-naphthyl group substituted by an alkyl group or an oxygen-containing substituent may be a disubstituted body or a trisubstituted body, and includes a 3,5-disubstituted 2-naphthyl group, a 3,8-disubstituted 2-naphthyl group, a 4,5-disubstituted 2-naphthyl group, a 1,4,5-trisubstituted 2-naphthyl group, etc.

The number of carbon atoms of $R^3$ is preferably 6 to 10, and more preferably 6 to 8.

$R^3$ is preferably a phenyl group, or a phenyl group substituted by an alkyl group. The phenyl group substituted by an alkyl group is preferably a 4-alkylphenyl group, and more preferably a 4-methylphenyl group, a 4-ethylphenyl group, a 4-n-propylphenyl group, or a 4-n-butylphenyl group.

$R^3$ is more preferably a phenyl group, a 4-methylphenyl group, or a 4-ethylphenyl group, and yet more preferably a phenyl group.

The alkyl group of $R^4$ includes a methyl group, an ethyl group, etc.

As a substituted amino group of $R^4$, a group represented by Formula (3) below is cited,

(3)

wherein $R^6$ and $R^7$ each independently represents a hydrocarbyl group or a trihydrocarbylsilyl group, or $R^6$ and $R^7$ are united to represent a hydrocarbylene group that may have a nitrogen atom and/or an oxygen atom as a hetero atom, or $R^6$ and $R^7$ form one group which is bonded to a nitrogen atom with a double bond, and * denotes a bonding position.

The hydrocarbyl group of $R^6$ and $R^7$ includes an alkyl group, an aryl group etc. The alkyl group includes a methyl group, an ethyl group, a n-propyl group, an isopropyl group, a n-butyl group, a sec-butyl group, a tert-butyl group, etc. The aryl group includes a phenyl group, etc. The hydrocarbyl group of $R^6$ and $R^7$ is preferably an alkyl group, and more preferably an alkyl group having 1 to 4 carbon atoms.

The trihydrocarbylsilyl group of $R^6$ and $R^7$ includes a trialkylsilyl group such as a trimethylsilyl group, a triethylsilyl group, a triisopropylsilyl group, and a tert-butyldimethylsilyl group. The trihydrocarbylsilyl group of $R^6$ and $R^7$ is preferably a trialkylsilyl group having 3 to 9 carbon atoms, and more preferably a trialkylsilyl group in which an alkyl group bonded to a silicon atom is an alkyl group having 1 to 3 carbon atoms is more preferable.

The hydrocarbylene group that is formed by uniting $R^6$ and $R^7$ and may have a nitrogen atom and/or an oxygen atom as a hetero atom includes an alkylene group such as an ethylene group, a trimethylene group, a tetramethylene group, a pentamethylene group and a hexamethylene group; a hydrocarbylene group having a nitrogen atom such as a group represented by —CH$_2$CH$_2$—NH—CH$_2$—, —CH$_2$CH$_2$—N=CH—, —CH=CH—N=CH— or —CH$_2$CH$_2$—NH—CH$_2$CH$_2$—; and a hydrocarbylene group having an oxygen atom such as a group represented by —CH$_2$CH$_2$—O—CH$_2$CH$_2$—.

In the present specification, the hydrocarbylene group having an X atom as a hetero atom represents a group having such a structure that a hydrogen atom and/or a carbon atom of the hydrocarbylene group is replaced by the X atom. For example, as a hydrocarbylene group having a nitrogen atom as a hetero atom, a group having such a structure that CH of the hydrocarbylene group is replaced by N is cited. And, as a hydrocarbylene group having an oxygen atom as a hetero atom, there are cited a group having such a structure that CH$_2$ is replaced by O, and a group having such a structure that two hydrogen atoms are replaced by O.

As to one group of $R^6$ and $R^7$ bonded to a nitrogen atom by a double bond, there are cited an ethylidene group, a propylidene group, a butylidene group, a 1-methylethylidene group, a 1-methylpropylidene group, a 1,3-dimethylbutylidene group, etc.

$R^4$ is preferably an alkyl group such as a methyl group or an ethyl group, or a dialkylamino group such as a dimethylamino group, a diethylamino group, a di(n-propyl)amino group or a di(n-butyl)amino group.

In Formula (1), n represents 1 or 2, and m+n=2 or 3, preferably m+n=3, and more preferably m is 1, and n is 2.

Examples of compounds represented by Formula (1) include, as compounds in which $R^5$ is a hydrogen atom and p=0,
tert-butoxydiphenylvinylsilane,
tert-pentoxydiphenylvinylsilane,
di(tert-butoxy)phenylvinylsilane,
di(tert-pentoxy)phenylvinylsilane,
tert-butoxymethylphenylvinylsilane,
tert-butoxyethylphenylvinylsilane,
dimethylamino-tert-butoxyphenylvinylsilane,
diethylamino-tert-butoxyphenylvinylsilane, etc.

Examples of compounds represented by Formula (1) include, as compounds in which $R^5$ is a hydrogen atom and p=1,
tert-butoxydiphenyl-4-vinylphenylsilane,
tert-butoxydiphenyl-3-vinylphenylsilane,
di(tert-butoxy)phenyl-4-vinylphenylsilane,
di(tert-butoxy)phenyl-3-vinylphenylsilane,
tert-butoxymethylphenyl-4-vinylphenylsilane,
tert-butoxymethylphenyl-3-vinylphenylsilane,
tert-butoxyethylphenyl-4-vinylphenylsilane,
tert-butoxyethylphenyl-3-vinylphenylsilane,
dimethylamino-tert-butoxyphenyl-4-vinylphenylsilane,
dimethylamino-tert-butoxyphenyl-3-vinylphenylsilane,
diethylamino-tert-butoxyphenyl-4-vinylphenylsilane,
diethylamino-tert-butoxyphenyl-3-vinylphenylsilane, etc.

Examples of compounds represented by Formula (1) include, as compounds in which $R^5$ is a methyl group and p=1,
tert-butoxydiphenyl-4-isopropenylphenylsilane,
tert-butoxydiphenyl-3-isopropenylphenylsilane,
di(tert-butoxy)phenyl-4-isopropenylphenylsilane,
di(tert-butoxy)phenyl-3-isopropenylphenylsilane,
tert-butoxymethylphenyl-4-isopropenylphenylsilane,
tert-butoxymethylphenyl-3-isopropenylphenylsilane,
tert-butoxyethylphenyl-4-isopropenylphenylsilane,
tert-butoxyethylphenyl-3-isopropenylphenylsilane,
dimethylamino-tert-butoxyphenyl-4-isopropenylphenylsilane,
dimethylamino-tert-butoxyphenyl-3-isopropenylphenylsilane,
diethylamino-tert-butoxyphenyl-4-isopropenylphenylsilane,
diethylamino-tert-butoxyphenyl-3-isopropenylphenylsilane,
etc.

Compounds represented by Formula (1) include preferably compounds in which $R^5$ is a hydrogen atom and p=0, more preferably
tert-butoxydiphenylvinylsilane,
di(tert-butoxy)phenylvinylsilane,
tert-butoxymethylphenylvinylsilane,
dimethylamino-tert-butoxyphenylvinylsilane and
diethylamino-tert-butoxyphenylvinylsilane,
yet more preferably
tert-butoxydiphenylvinylsilane and
di(tert-butoxy)phenylvinylsilane,
and particularly preferably tert-butoxydiphenylvinylsilane.

The content of a monomer unit based on the compound represented by Formula (1) is preferably not less than 0.01% by weight relative to 100% by weight of the conjugated diene polymer, and more preferably not less than 0.02% by weight, in order to heighten the strength. And, in order to heighten the economical efficiency, it is preferably not more than 2% by weight, and more preferably not more than 1% by weight.

In the conjugated diene polymer of the present invention, it is preferable that a monomer unit based on the monomer represented by Formula (1) exists in the chain, that is, a monomer unit based on the monomer represented by Formula (1), or a partial chain including a monomer unit based on the monomer represented by Formula (1) exists between a partial chain having a monomer unit based on the conjugated diene group (the partial chain does not have a monomer unit based on the monomer represented by Formula (1)) and a partial chain having a monomer unit based on the conjugated diene group (the partial chain does not have the monomer unit based on the monomer represented by Formula (1)).

The conjugated diene polymer of the present invention preferably has a monomer unit based on vinyl aromatic hydrocarbon (vinyl aromatic hydrocarbon unit), in order to heighten the strength. The vinyl aromatic hydrocarbon includes styrene, α-methylstyrene, vinyltoluene, vinylnaphthalene, divinylbenzene, trivinylbenzene, and divinylnaphthalene. Styrene is preferable.

The content of the vinyl aromatic hydrocarbon unit is, when denoting the total amount of the conjugated diene unit and the vinyl aromatic hydrocarbon unit by 100% by weight, preferably not less than 10% by weight (the content of the conjugated diene unit is not more than 90% by weight), and more preferably not less than 15% by weight (the content of the conjugated diene unit is not more than 85% by weight). Moreover, in order to heighten fuel economy, the content of the vinyl aromatic hydrocarbon unit is preferably not more than 50% by weight (the content of the conjugated diene unit is not less than 50% by weight), and more preferably not more than 45% by weight (the content of the conjugated diene unit is not less than 55% by weight).

The Mooney viscosity ($ML_{1+4}$) of the conjugated diene polymer of the present invention is preferably not less than 10, and more preferably not less than 20, in order to heighten the strength. Moreover, in order to heighten the processability, it is preferably not more than 200, and more preferably not more than 150. The Mooney viscosity ($ML_{1+4}$) is measured at 100° C. according to JIS K6300 (1994).

The vinyl bond content (proportion of conjugated diene-based 1,2-addition constitutional unit) of the conjugated diene polymer of the present invention is, when denoting the content of the conjugated diene unit by 100% by mol, preferably not more than 80% by mol, and more preferably not more than 70% by mol, in order to heighten the fuel economy. Moreover, in order to heighten grip properties, it is preferably not less than 10% by mol, more preferably not less than 15% by mol, yet more preferably not less than 20% by mol, and particularly preferably not less than 40% by mol. The vinyl bond content is obtained by the absorption intensity near 910 $cm^{-1}$ that is the absorption peak of a vinyl group by infrared spectroscopic analysis.

The molecular weight distribution of the conjugated diene polymer of the present invention is preferably 1.0 to 5.0, and more preferably 1.0 to 1.5, in order to heighten the fuel economy. The molecular weight distribution is obtained by measuring the number average molecular weight (Mn) and the weight average molecular weight (Mw) by a gel permeation chromatography (GPC), and dividing Mw by Mn.

As a favorable method for producing the conjugated diene polymer of the present invention, there can be cited a method of polymerizing a monomer component containing a conjugated diene and a compound represented by Formula (1) by an alkali metal catalyst in a hydrocarbon solvent.

The alkali metal catalyst includes alkali metals, organic alkali metal compounds, complexes of an alkali metal and a polar compound, oligomers having an alkali metal, etc. The alkali metal includes lithium, sodium, potassium, rubidium, cesium, etc. The organic alkali metal compound includes ethyl lithium, n-propyl lithium, iso-propyl lithium, n-butyl lithium, sec-butyl lithium, t-octyl lithium, n-decyl lithium, phenyl lithium, 2-naphthyl lithium, 2-butylphenyl lithium, 4-phenylbutyl lithium, cyclohexyl lithium, 4-cyclopentyl lithium, dimethylaminopropyl lithium, diethylaminopropyl lithium, t-butyldimethylsilyloxypropyl lithium, N-morpholinopropyl lithium, lithium hexamethyleneimide, lithiumpyrrolidide, lithium piperidide, lithium heptamethyleneimide, lithium dodecamethyleneimide, 1,4-dilithio-2-butene, sodium naphthalenide, sodium biphenylide, potassium naphthalenide, etc. The complex of an alkali metal and a polar compound includes potassium-tetrahydrofuran complex, potassium-diethoxyethane complex, etc., and the oligomer having an alkali metal includes a sodium salt of α-methylstyrene tetramer. Organic lithium compounds or organic sodium compounds are preferable, and organic lithium compounds having 2 to 20 carbon atoms or organic sodium compounds having 2 to 20 carbon atoms are more preferable.

The hydrocarbon solvent is a solvent that does not deactivate the organic alkali metal compound catalyst, and includes aliphatic hydrocarbon, aromatic hydrocarbon, alicyclic hydrocarbon, etc. The aliphatic hydrocarbon includes propane, n-butane, iso-butane, n-pentane, iso-pentane, n-hexane, propene, 1-butene, iso-butene, trans-2-butene, cis-2-butene, 1-pentene, 2-pentene, 1-hexene, 2-hexene, etc. The aromatic hydrocarbon includes benzene, toluene, xylene, ethylbenzene, and the alicyclic hydrocarbon includes cyclopentane, cyclohexane, etc. These are used in not less than one, and the hydrocarbon solvent may be a mixture of various kinds of components such as industrial hexane. Hydrocarbons having 2 to 12 carbons are preferable.

A monomer component containing a conjugated diene and a compound represented by Formula (1) is polymerized by an alkali metal catalyst in a hydrocarbon solvent to produce a polymer having the monomer unit based on the conjugated diene and the monomer unit based on the compound represented by Formula (1). The conjugated diene includes 1,3-butadiene, isoprene, 1,3-pentadiene, 2,3-dimethyl-1,3-butadiene, and 1,3-hexadiene. These are used in not less than one. 1,3-butadiene or isoprene is preferable.

The usage amount of the compound represented by Formula (1) is, when denoting the total usage amount of monomer components used in the polymerization by 100% by weight, preferably not less than 0.01% by weight, and more preferably not less than 0.02% by weight, in order to heighten the strength. Moreover, in order to heighten economical efficiency, it is preferably not more than 2% by weight, and more preferably not more than 1% by weight.

As a monomer, a vinyl aromatic hydrocarbon may be polymerized in combination with the conjugated diene and the compound represented by Formula (1). The vinyl aromatic hydrocarbon includes styrene, α-methylstyrene, vinyltoluene, vinylnaphthalene, divinylbenzene, trivinylbenzene, divinylnaphthalene, etc. Styrene is preferable.

The usage amount of the vinyl aromatic hydrocarbon is, when denoting the total usage amount of the conjugated diene and the vinyl aromatic hydrocarbon by 100% by weight, not less than 0% by weight (the usage amount of the conjugated diene is not more than 100% by weight), in order to heighten the strength, preferably not less than 10% by weight (the usage amount of the conjugated diene is not more than 90% by weight), and more preferably not less than 15% by weight (the usage amount of the conjugated diene is not more than 85% by weight). Moreover, in order to heighten the fuel economy, the usage amount of the vinyl aromatic hydrocarbon is preferably not more than 50% by weight (the usage amount of the conjugated diene is not less than 50% by weight), and more preferably not more than 45% by weight (the usage amount of the conjugated diene is not less than 55% by weight).

The polymerization reaction may be carried out in the presence of an agent for regulating the vinyl bond amount of the conjugated diene unit, an agent for regulating the distribution of the conjugated diene unit and the constituent units based on monomers other than the conjugated diene in the conjugated diene polymer chain (hereinafter, generally cited as "regulators") etc. As the regulator, ether compounds, tertiary amines, phosphine compounds, etc can be cited. Examples of the ether compounds include cyclic ethers such as tetrahydrofuran, tetrahydropyran, 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether anisole, etc. Examples of the tertiary amines include triethylamine, tripropylamine, tributylamine, N,N,N',N'-tetramethylethylenediamine, N,N-diethylaniline, pyridine, quinoline, etc. Examples of the phosphine compounds include trimethylphosphine, triethylphosphine, triphenylphosphine, etc. These regulators may be used singly or in a combination of two or more.

The polymerization temperature is preferably 25 to 100° C., more preferably 35 to 90° C., and yet more preferably 50 to 80° C. The polymerization time is preferably 10 minutes to 5 hours.

In the production of the present invention, if necessary, a coupling agent may be added to the hydrocarbon solution of the conjugated diene polymer in a period from the start of polymerizing the monomer by the alkali metal catalyst to the end. As the coupling agent, compounds represented by Formula (4) below are cited.

$$R^{11}{}_a ML_{4-a} \qquad (4)$$

wherein $R^{11}$ represents an alkyl group, an alkenyl group, a cycloalkenyl group or an aryl group, M represents a silicon atom or a tin atom, L represents a halogen atom or a hydrocarbyloxy group, and a represents an integer of 0 to 2.

Examples of the coupling agents represented by Formula (4) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane diethoxydiethylsilane, etc.

The amount of the coupling agent that may be added is, in order to improve the processability of the conjugated diene polymer, preferably not less than 0.03 mol relative to 1 mol of the alkali metal from the alkali metal catalyst, and more preferably not less than 0.05 mol. And, in order to improve the fuel economy, it is preferably not more than 0.4 mol, and more preferably not more than 0.3 mol.

The conjugated diene polymer can be collected from the hydrocarbon solution of the conjugated diene polymer by known collecting methods can be cited. For example, there can be cited (1) a method of adding a coagulant to the hydrocarbon solution of the conjugated diene polymer, and (2) a method of giving steam to the hydrocarbon solution of the conjugated diene polymer, etc. The collected conjugated diene polymer may be dried by a known drying machine such as a band drying machine or an extrusion drying machine.

The conjugated diene polymer of the present invention can be mixed with another polymer component or an additive to be used as a conjugated diene polymer composition.

Examples of the other polymer components include conventional styrene-butadiene copolymer rubber, polybutadiene rubber, butadiene-isoprene copolymer rubber, butyl rubber, etc, and, in addition, natural rubber, ethylene-propylene copolymer, ethylene-octane copolymer, etc. These polymer components may be used singly or in a combination of two or more.

When the conjugated diene polymer of the present invention is mixed with another polymer component, the content of the conjugated diene polymer of the present invention is preferably not less than 10% by weight relative to 100% by weight of the total content of the polymer components (including the content of the conjugated diene polymer), and more preferably not less than 20% by weight in order to improve the strength.

As the additive, a known additive may be used, and examples thereof include a vulcanizing agent such as sulfur; a vulcanizing accelerator such as a thiazole-based vulcanizing accelerator, a thiuram-based vulcanizing accelerator, a sulfenamide-based vulcanizing accelerator, a guanidine-based vulcanizing accelerator; a vulcanizing activator such as stearic acid or zinc oxide; a reinforcing agent such as silica or carbon black; a filler such as calcium carbonate, talc, alumina, clay, aluminum hydroxide or mica; a silane coupling agent; an extender oil; a processing aid; an antioxidant; and a lubricant.

Examples of the sulfur include powdered sulfur, precipitated sulfur, colloidal sulfur, insoluble sulfur, and high dispersion sulfur. The amount of sulfur to be mixed is preferably 0.1 to 15 parts by weight relative to 100 parts by weight of the polymer component, more preferably 0.3 to 10 parts by weight, yet more preferably 0.5 to 5 parts by weight.

Examples of the vulcanizing accelerators include thiazole-based vulcanizing accelerators such as 2-mercaptobenzothiazole, dibenzothiazyl disulfide, and N-cyclohexyl-2-benzothiazylsulfenamide; thiuram-based vulcanizing accelerators such as tetramethylthiuram monosulfide and tetramethylthiuram disulfide; sulfenamide-based vulcanizing accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanizing accelerators such as diphenylguanidine, diorthotolylguanidine, and orthotolylbiguanidine. The amount of the vulcanizing accelerator to be mixed is preferably 0.1 to 5 parts by weight relative to 100 parts by weight of the polymer component, and more preferably 0.2 to 3 parts by weight.

Examples of the silica include dry silica (anhydrous silicic acid), wet silica (hydrated silicic acid), colloidal silica, precipitated silica, calcium silicate, and aluminum silicate. These silicas may be used singly or in a combination of two or more. The BET specific surface area of the silica is preferably 50 to 250 m$^2$/g. The BET specific surface area is measured according to ASTM D1993-03. As a commercial product, a trade name ULTRASIL VN3-G manufactured by Degussa, Inc., trade names VN3, AQ, ER, and RS-150 manufactured by Tosoh Silica Corporation, trade names Zeosil 1115 MP and 1165 MP manufactured by Rhodia, etc. may be used.

Examples of the carbon black include furnace black, acetylene black, thermal black, channel black, carbon, etc. Examples of the carbon black include channel carbon black such as EPC, MPC, and CC; furnace carbon black such as SAF, ISAF, HAF, MAF, FEF, SRF, GPF, APF, FF, CF, SCF, and ECF; thermal carbon black such as FT and MT; acetylene carbon black; and graphite. These carbons may be used singly or in a combination of two or more.

The nitrogen adsorption specific surface area ($N_2$ SA) of the carbon black is preferably 5 to 200 m$^2$/g, and the dibutyl phthalate (DBP) absorption of the carbon black is preferably 5 to 300 mL/100 g. The nitrogen adsorption specific surface area is measured according to ASTM D4820-93, and the DBP absorption is measured according to ASTM D2414-93. As a commercial product, a trade name DIABLACK N339 manufactured by Mitsubishi Chemical Corporation, trade names SEAST 6, SEAST 7HM, and SEAST KH manufactured by Tokai Carbon Co., Ltd., trade names CK 3 and Special Black 4A manufactured by Degussa, Inc., etc. may be used.

When the conjugated diene polymer of the present invention is mixed with the reinforcing agent, the content of the reinforcing agent is preferably 10 to 150 parts by weight relative to 100 parts by weight of the conjugated diene polymer. The content is more preferably not less than 20 parts by weight, and yet more preferably not less than 30 parts by weight, in order to improve abrasion resistance and strength. And, it is more preferably not more than 120 parts by weight, and yet more preferably not more than 100 parts by weight, in order to improve reinforcement.

When the conjugated diene polymer of the present invention is mixed with the reinforcing agent, in order to improve the fuel economy, the reinforcing agent is preferably silica. The content of silica is preferably not less than 50% by weight relative to 100% by weight of the total content of the reinforcing agent, and more preferably not less than 70% by weight.

Examples of the silane coupling agents include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl)tetrasulfide, γ-trimethoxysilylpropyldimethylthiocarbamyltetrasulfide, and γ-trimethoxysilylpropylbenzothiazyltetrasulfide. These agents may be used singly or in a combination of two or more. As a commercial product, trade names Si69 and Si75 manufactured by Degussa, Inc., etc. may be used.

When the conjugated diene polymer of the present invention is mixed with the silane coupling agent, the content of the silane coupling agent is preferably 1 to 20 parts by weight relative to 100 parts by weight of silica, more preferably 2 to 15 parts by weight, yet more preferably 5 to 10 parts by weight.

Examples of the extender oils include aromatic mineral oils (viscosity-gravity constant (V. G. C. value) 0.900 to 1.049), naphthenic mineral oils (V. G. C. value 0.850 to 0.899), paraffinic mineral oils (V. G. C. value 0.790 to 0.849), etc. The polycyclic aromatic content of the extender oil is preferably less than 3% by weight, and more preferably less than 1% by weight. The polycyclic aromatic content is measured according to British Institute of Petroleum method 346/92. Furthermore, the aromatic compound content (CA) of the extender oil is preferably not less than 20% by weight. These extender oils may be used singly or in a combination of two or more.

As a method for producing a conjugated diene polymer composition by mixing another polymer component with the conjugated diene polymer of the present invention, an additive, etc. with the conjugated diene polymer, a known method such as a method, for example, in which the components are kneaded by means of a known mixer such as a roll or Banbury mixer can be used.

With regard to kneading conditions, when an additive other than the vulcanizing agent or the vulcanizing accelerator is mixed, the kneading temperature is preferably 50° C. to 200° C. and more preferably 80° C. to 190° C., and the kneading time is preferably 30 seconds to 30 minutes and more preferably 1 minute to 30 minutes. When the vulcanizing agent or the vulcanizing accelerator is mixed, the kneading temperature is preferably not more than 100° C., and more preferably room temperature (25° C.) to 80° C. A composition in which a vulcanizing agent or a vulcanizing accelerator is mixed is preferably used after carrying out a vulcanization treatment such as press vulcanization. The vulcanization temperature is preferably 120° C. to 200° C., and more preferably 140° C. to 180° C.

The conjugated diene polymer and the conjugated diene polymer composition of the present invention has excellent strength.

The conjugated diene polymer and the conjugated diene polymer composition of the present invention are used for tires, shoe soles, flooring materials, vibration-proofing materials, etc., and are used particularly suitably for tires.

According to the present invention, it is possible to provide a conjugated diene polymer capable of giving a polymer composition excellent in tensile strength, a polymer composition containing the conjugated diene polymer and a reinforcing agent such as silica, and a method for producing the conjugated diene polymer.

EXAMPLES

Hereinafter, the present invention will be explained by reference to Examples.

'Normal temperature' in the Examples means 25° C.

Physical properties were evaluated by the following methods.

1. Mooney Viscosity ($ML_{1+4}$)

The Mooney viscosity of a polymer was measured at 100° C. according to JIS K6300 (1994).

2. Vinyl bond Content (unit: % by mol)

The vinyl bond content of a polymer was determined from the absorption intensity near 910 cm$^{-1}$ by IR spectroscopy, which is an absorption peak of a vinyl group.

3. Styrene Unit Content (unit: % by weight)

The styrene unit content of a polymer was determined from refractive index according to JIS K6383 (1995).

4. Molecular weight distribution (Mw/Mn)

Weight-average molecular weight (Mw) and number-average molecular weight (Mn) were measured by a gel permeation chromatograph (GPC) method under conditions (1) to (8) below, and the molecular weight distribution (Mw/Mn) of the polymer was determined.

(1) Instrument: HLC-8220 manufactured by Tosoh Corporation (2) Separation column: HM-H (2 columns in tandem) manufactured by Tosoh Corporation (3) Measurement temperature: 40° C.

(4) Carrier: tetrahydrofuran (5) Flow rate: 0.6 mL/min (6) Amount injected: 5 mL (7) Detector: differential refractometer (8) Molecular weight standard: standard polystyrene 5. Tensile strength (TB, unit: MPa)

According to JIS K6251, a dumbbell No. 3 test piece was used and the pulling rate was set to be 500 mm/min, and the stress when the test piece was broken was determined.

6. Breaking elongation (EB, unit: %)

According to JIS K6251, a dumbbell No. 3 test piece was used and the pulling rate was set to be 500 mm/min, and the elongation when the test piece was broken was determined.

Example 1

The interior of a stainless polymerization reaction vessel having an interior volume of 5 litters equipped with a stirrer was washed, dried, and flushed with dry nitrogen. Next, the vessel was charged with 2.55 kg of industrial hexane (density: 680 kg/m$^3$), 137 g of 1,3-butadiene, 43 g of styrene, 0.81 g of tert-butoxydiphenylvinylsilane, 1.52 ml of tetrahydrofuran and 1.18 ml of ethylene glycol diethyl ether. Next, the vessel was charged with 2.88 mmol of n-butyl lithium as a n-hexane solution to initiate polymerization reaction.

Copolymerization of 1,3-butadiene and styrene was carried out at a stirring speed of 130 rpm and a polymerization reactor internal temperature of 65° C. for 2 hours while continuously supplying the monomers to the polymerization reactor. The amount of 1,3-butadiene supplied was 205 g, and the amount of styrene supplied was 65 g. The ratio of tert-butoxydiphenylvinylsilane charged was 0.18% by weight in the total amount of monomers charged or supplied in the vessel.

To the polymer solution, 10 ml of a hexane solution containing 0.2 ml of methanol was added, which was stirred for further 5 minutes.

To the polymerization reaction solution, 1.8 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.), and 0.9 g of pentaerythrityl tetrakis(3-laurylthiopropionate) (trade name: Sumilizer TP-D, manufactured by Sumitomo Chemical Co., Ltd.) were added, and subsequently the polymerization reaction solution was evaporated at normal temperature for 24 hours and, furthermore, dried under vacuum at 55° C. for 12 hours to give a polymer. The evaluation results of the polymer are shown in Table 1.

100 parts by weight of the polymer thus obtained, 78.4 parts by weight of silica (trade name: Ultrasil VN3-G, manufactured by Degussa, Inc.), 6.4 parts by weight of a silane coupling agent (trade name: Si69, manufactured by Degussa, Inc.), 6.4 parts by weight of carbon black (trade name: DIABLACK N339, manufactured by Mitsubishi Chemical Corp.), 47.6 parts by weight of an extender oil (trade name: JOMO PROCESS NC-140, manufactured by Japan Energy Corporation), 1.5 parts by weight of an antiaging agent (trade name: Antigene 3C, manufactured by Sumitomo Chemical Co., Ltd.), 2 parts by weight of stearic acid, 2 parts by weight of zinc oxide, 1 part by weight of a vulcanizing accelerator (trade name: Soxinol CZ, manufactured by Sumitomo Chemical Co., Ltd.), 1 part by weight of a vulcanizing accelerator (trade name: Soxinol D, manufactured by Sumitomo Chemical Co., Ltd.), 1.5 parts by weight of a wax (trade name:

Sunnoc N, manufactured by Ouchi Shinko Chemical Industrial Co., Ltd.), and 1.4 parts by weight of sulfur were kneaded by means of a Labo Plastomill to prepare a polymer composition. The polymer composition thus obtained was molded into a sheet using 6-inch rolls, and the sheet was vulcanized by the heating at 160° C. for 45 minutes to prepare a vulcanized sheet. The evaluation results of the physical properties of the vulcanized sheet are shown in Table 1.

Comparative Example 1

A stainless polymerization reaction vessel having an interior volume of 20 litters equipped with a stirrer was washed, dried, and flushed with dry nitrogen. Next, the vessel was charged with 10.2 kg of industrial hexane (density: 680 kg/m$^3$), 608 g of 1,3-butadiene, 192 g of styrene, 6.1 ml of tetrahydrofuran and 4.0 ml of ethylene glycol diethyl ether. Next, the vessel was charged with 12.40 mmol of n-butyl lithium as a n-hexane solution to initiate polymerization.

Copolymerization of 1,3-butadiene and styrene was carried out at a stirring speed of 130 rpm and a polymerization reactor internal temperature of 65° C. for 3 hours while continuously supplying the monomers to the polymerization reactor. The amount of 1,3-butadiene supplied was 912 g, and the amount of styrene supplied was 288 g. To the polymer solution, 20 ml of a hexane solution containing 0.8 ml of methanol was added, which was stirred for further 5 minutes.

To the polymerization reaction solution, 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.), and 4.0 g of pentaerythrityltetrakis(3-laurylthiopropionate) (trade name: Sumilizer TP-D, manufactured by Sumitomo Chemical Co., Ltd.) were added, and next the polymer solution was evaporated at normal temperature for 24 hours and, furthermore, dried under vacuum at 55° C. for 12 hours to give a polymer. The evaluation results of the polymer are shown in Table 1.

100 parts by weight of the polymer thus obtained, 78.4 parts by weight of silica (trade name: Ultrasil VN3-G, manufactured by Degussa, Inc.), 6.4 parts by weight of a silane coupling agent (trade name: Si69, manufactured by Degussa, Inc.), 6.4 parts by weight of carbon black (trade name: DIABLACK N339, manufactured by Mitsubishi Chemical Corp.), 47.6 parts by weight of an extender oil (trade name: JOMO PROCESS NC-140, manufactured by Japan Energy Corporation), 1.5 parts by weight of an antiaging agent (trade name: Antigene 3C, manufactured by Sumitomo Chemical Co., Ltd.), 2 parts by weight of stearic acid, 2 parts by weight of zinc oxide, 1 part by weight of a vulcanizing accelerator (trade name: Soxinol CZ, manufactured by Sumitomo Chemical Co., Ltd.), 1 part by weight of a vulcanizing accelerator (trade name: Soxinol D, manufactured by Sumitomo Chemical Co., Ltd.), 1.5 parts by weight of a wax (trade name:

Sunnoc N, manufactured by Ouchi Shinko Chemical Industrial Co., Ltd.), and 1.4 parts by weight of sulfur were kneaded by means of a Labo Plastomill to prepare a polymer composition. The polymer composition thus obtained was molded into a sheet using 6-inch rolls, and the sheet was vulcanized by the heating at 160° C. for 45 minutes to prepare a vulcanized sheet. The evaluation results of the physical properties of the vulcanized sheet are shown in Table 1.

TABLE 1

|  |  | Example 1 | Comparative Example 1 |
| --- | --- | --- | --- |
| Mooney viscosity | — | 49.8 | 39.2 |
| Vinyl bond content | % by mol | 58.3 | 56.7 |
| Content of styrene unit | % by weight | 23.1 | 24.6 |
| Molecular weight distribution | — | 1.09 | 1.06 |
| Tensile strength TB | MPa | 14.0 | 11.7 |
| Breaking elongation EB | % | 495 | 430 |

The invention claimed is:

1. A method for producing a conjugated diene polymer comprising the step of polymerizing a monomer component containing a conjugated diene and a compound represented by Formula (1) below by an alkali metal catalyst in a hydrocarbon solvent, $$R^1Si(OR^2)_m R^3_n R^4_{(3-m-n)} \quad (1)$$

wherein m represents 1 or 2; n represents 1 or 2; m+n=2 or 3; $R^1$ represents a hydrocarbyl group having a polymerizable carbon-carbon double bond; $R^2$ represents a hydrocarbyl group, and, when there are plural $R^2$s, $R^2$s each may be the same or different; $R^3$ represents an aryl group that may have an oxygen-containing substituent, and, when there are plural $R^3$s, $R^3$s each may be the same or different; and $R^4$ represents an alkyl group or a substituted amino group.

2. The method for producing a conjugated diene polymer according to claim 1, wherein m+n=3; $R^1$ is a group represented by Formula (2) below; $R^2$ is a tertiary alkyl group; $R^3$ is a phenyl group that may have an alkyl group,

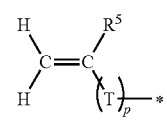

(2)

wherein p is 0 or 1, $R^5$ represents a hydrogen atom or a hydrocarbyl group, and T represents a hydrocarbylene group, and * denotes a bonding position.

3. The method for producing a conjugated diene polymer according to claim 2, wherein $R^5$ is a hydrogen atom, and p is 0.

* * * * *